Aug. 29, 1944.  L. F. HARMAN ET AL  2,356,786
AIRPLANE FUEL SYSTEM
Filed Nov. 14, 1941   2 Sheets-Sheet 1
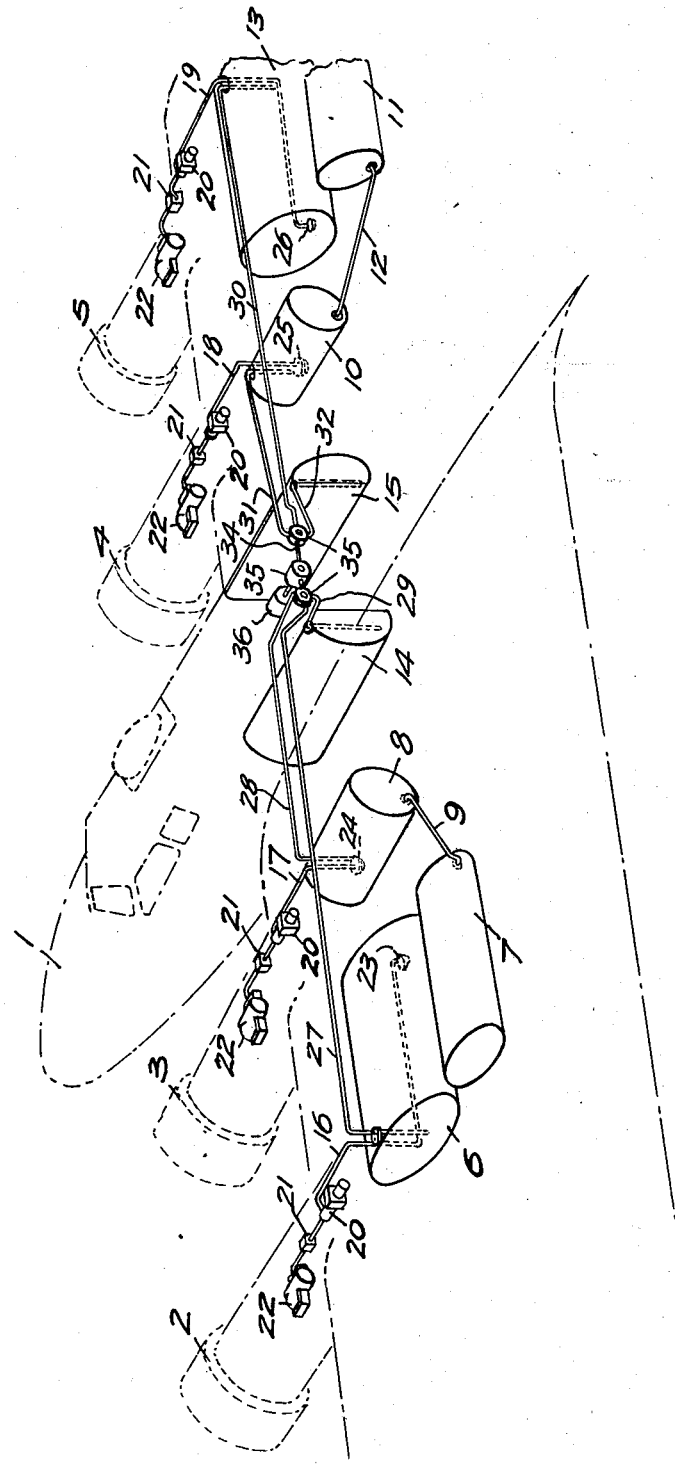
INVENTORS
LEONARD F. HARMAN
ORVAL H. SNYDER

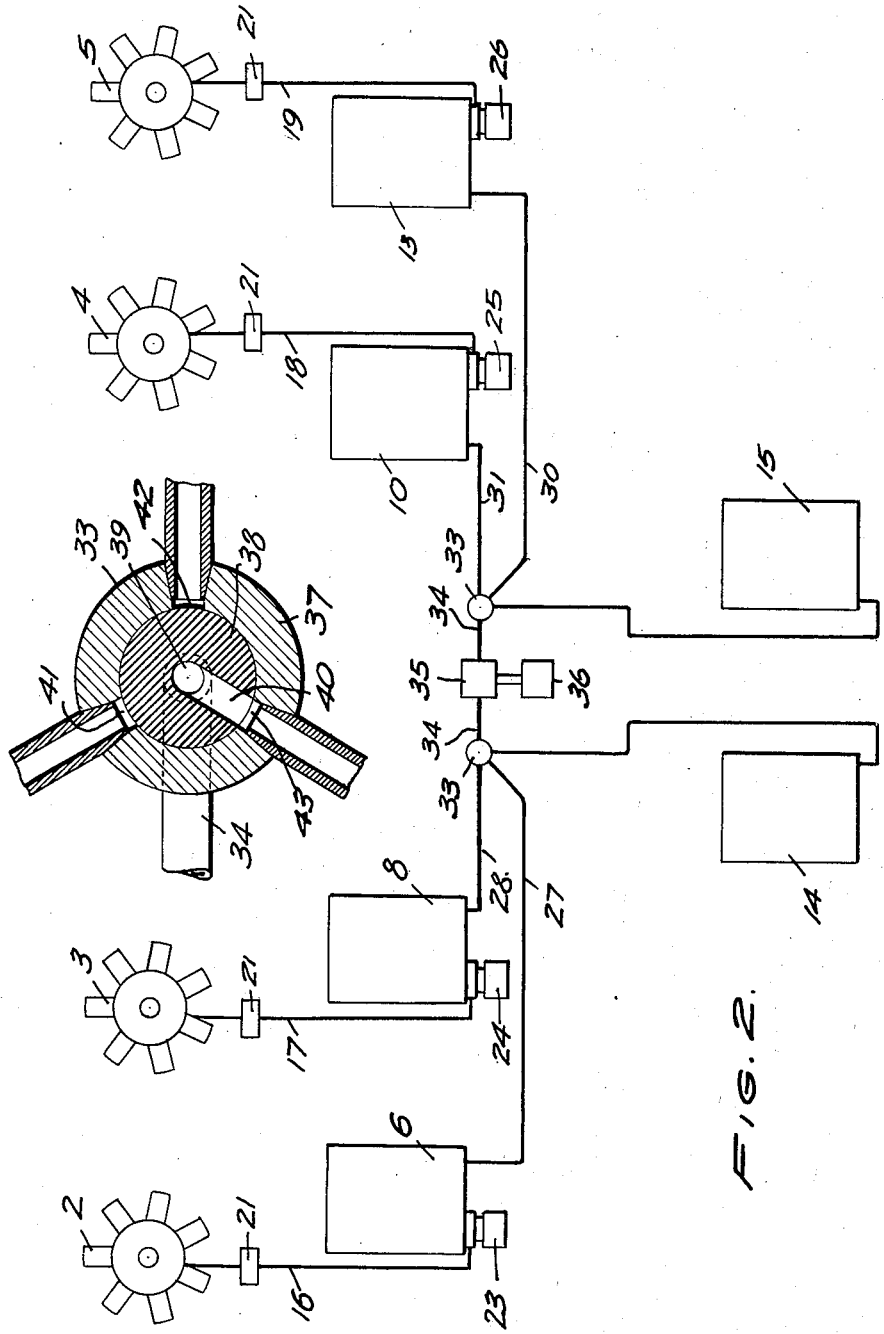

Patented Aug. 29, 1944

2,356,786

UNITED STATES PATENT OFFICE 2,356,786

AIRPLANE FUEL SYSTEM

Leonard F. Harman, Osborn, Ohio, and Orval H. Snyder, San Diego, Calif.

Application November 14, 1941, Serial No. 419,518

6 Claims. (Cl. 158—36.3)

(Granted under the act of March 3, 1883, as amended April 30, 1928; 370 O. G. 757)

The invention described herein may be manufactured and used by or for Government for governmental purposes, without the payment to us of any royalty thereon.

This invention relates to an improved fuel system for multi-engined aircraft and more particularly to a greatly simplified system in which the number of fuel lines, valves, cocks, remote control devices, etc., have been reduced to the absolute minimum, thus making feasible the use of flexible or bullet-proof hose for the fuel lines in place of the thin-walled aluminum tubing customarily used for that purpose. In the existing fuel systems the number of lines and the lengths thereof are such as to prohibit the use of flexible or bullet-proof hose which is considerably heavier than aluminum tubing. The use of flexible hose greatly simplifies the installation and maintenance of the lines and also reduces the possibility of failure due to fatigue caused by vibrations set up in the line from the engines, landing shocks, etc. The simplification of the system also greatly reduces vulnerability thereof to damage from enemy gun fire due to the fewer lines and the fewer vital elements interposed in those lines.

The fuel systems in use on multiengined aircraft prior to our invention were very complicated, heavy, difficult to repair and extremely vulnerable to damage from enemy gun fire. As a result of leading the fuel lines from the various tanks through a common valve or pump it was possible that the fuel supply for all the engines of the craft would be cut off in case that valve or pump were struck and injured by a bullet. In the simplified system forming the subject matter of this invention, no such common valves or pumps are utilized but instead the fuel line for each engine is led from the tank associated with the engine directly to the engine itself without any meanderings or detours through miscellaneous valves, cocks, pumps, tanks, etc.

Whereas rigid aluminum tubing was previously used for fuel lines, we propose the use of flexible hose, thus greatly simplifying the matter of installing the system in the aircraft and also greatly facilitating the repair of a damaged line. Due to the many bends present in the conventional aluminum lines the facilities of a repair depot were required whenever it became necessary to replace a damaged line with a new one. In making repairs with flexible hose, however, it is only necessary to cut off a piece of hose of the proper length and size and then fasten it to the appropriate fittings.

The opportunities for failure in the fuel supply system have also been greatly reduced due to the fewer number of parts making up the system. There are no longer any remote control valves, pumps or other delicate mechanisms which may easily get out of order and thus cause failure of the supply of fuel to the engines. The amount of equipment eliminated by the improved system is illustrated by the fact that in the case of one four-engined plane a total weight of four-hundred pounds was removed from the plane through the installation of our improved system. Whereas numerous failures previously occurred in the fuel supply system due to breakage of fuel lines through fatigue failures, this possibility has been eliminated by the use of flexible hose. Another advantage of our system over the old ones is that a positive supply of fuel to the engines is insured even at the highest altitudes reached by present-day aircraft, whereas with the old system vapor locks were prevalent at these high altitudes due to the high resistance to the flow of fuel occasioned by the many bends and obstructions in the lines and also by reason of the extreme length thereof. These vapor locks were especially prevalent when "hot" fuel was used, that is, fuel having a relatively high temperature, whereas with our short, straight lines this difficulty no longer exists even when running on so-called "hot" fuel.

In our system we also propose the use of booster pumps located at the bottom of the fuel tanks for the purpose of insuring the positive delivery of fuel to the fuel pump located just behind the carburetor of each engine. These booster pumps are motor driven and are of the rotary centrifugal type, thus permitting the flow of fuel from the tank to the engine even when the pump is not operating. Thus, any failure of the pump mechanism will not interfere with the flow of fuel to the engine and, though the altitude at which the craft can then fly may be reduced, total engine failure will be prevented.

We have also provided in our system a means whereby the fuel may be transferred from one tank to another so that in case of a leaking tank or a dead engine the fuel from that tank may be run into a reserve tank or the tank of another engine and thereby be made available for use. With the previous system this was not possible and, in the case of a leaking tank, there was no means of saving the fuel escaping therefrom.

Accordingly, it is an object of our invention to provide a simplified fuel system for multiengined aircraft having the advantages of light weight, quick and easy repairs and, above all, reduced vulnerability to damage by bullets or shell fragments.

Another object of our invention is to provide a fuel system in which the use of flexible hose for fuel lines is made possible. By so doing the danger of failure due to fatigue of the lines is removed and quick and inexpensive repairs to damaged lines may be effected.

Another object of our invention is to provide a fuel system in which the use of bullet-proof components such as tanks and lines is made feasible and is within the realm of possibility due to the greatly reduced length of the lines. The system is thus made much more reliable in combat and the danger of fire from escaping gasoline is reduced.

Another object of our invention is to provide a system which will permit the aircraft to fly at much higher altitudes than has heretofore been possible. This is accomplished through the use of short direct lines from tank to motor and also by the provision of a booster pump located in the bottom of each tank.

Another object of our invention is to provide a fuel system in which the fuel in any tank may be transferred to any other tank, thereby greatly increasing the flexibility of the system and rendering it possible to save fuel which might otherwise be lost or rendered useless.

A preferred embodiment of our invention will be hereinafter described with reference to the accompanying drawings, given merely by way of example, in which:

Figure 1 is a perspective view showing in dot-dash outlines a multiengined aircraft equipped with our simplified system which is shown in solid lines. From this figure the shortness of the fuel lines, as well as the small number of the same, and the remarkable simplicity of the improved system will be readily apparent.

Figure 2 is a diagrammatic view showing the arrangement of the engines, tanks, and fuel lines involved in the improved system.

Figure 3 is a cross-sectional elevation of one of the selector valves showing in detail the construction of the same.

The general arrangement of our improved fuel supply system may be seen from Figure 1 where 1 designates the aircraft on which the system is installed. This aircraft is provided with four engines 2, 3, 4 and 5 (see also Figure 2), each of which is provided with its own fuel tank located adjacent thereto. As shown in Figure 1 the engine 2 is supplied with fuel from the tank 6 while the engine 3 is supplied from the two tanks 7 and 8 which are joined together by a short fuel line 9 extending from the bottom of one tank to the bottom of the other. The engine 4 is fed from the two fuel tanks 10 and 11 which are connected together by a fuel line 12, running from the bottom of one tank to the bottom of the other. The engine 5 is fed from the tank 13. Tanks 7 and 8 may be considered as a single tank as may also tanks 10 and 11 by virtue of their being tied together by the lines 9 and 12. Due to the geometry of the craft and the space available therein it is necessary to make use of the two smaller tanks located at right angles to one another rather than a single tank such as is used for motors 2 and 5. The combined capacities of tanks 7 and 8 are equal to that of tank 6 and similarly the capacities of tanks 10 and 11 are equal to that of 13. Two reserve tanks 14 and 15 may be provided in the fuselage of the aircraft, as shown in Figure 1, if this is desirable.

Each of the tanks 6, 8, 10 and 13 is connected to its associated engine by one of the short direct fuel lines 16, 17, 18 and 19. In each case the fuel is led through a filter 20 and a fuel pump 21 before it reaches the carburetor 22 of its respective engine. At the bottom of each of the tanks 6, 8, 10 and 13 is located a motor-driven booster pump 23, 24, 25 and 26, the intake port of which communicates with the interior of the tank and the exhaust port of which is connected to the lower end of one of the fuel lines 16, 17, 18 and 19. These pumps are of the rotary centrifugal type and serve to lift the fuel from the bottom of the tanks up to the level of the engine fuel pumps 21 located on or near the engines. Thus a positive supply of fuel to the pumps 21 is always insured and there can be no possibility of any so-called "vapor lock" or cavitation occurring in the fuel line between the tank and the pump 21. Inasmuch as the booster pumps 23 to 26 are of the centrifugal type, the fuel supply to the engine will not be cut off even though the booster pump should become disabled and cease to operate due to failure of its driving motor.

From each of the fuel tanks 6, 8 and 14, a fuel line 27, 28 and 29 extends to a port on the left-hand selector valve 33 located within the fuselage of the aircraft. Similarly, from each of the tanks 10, 13 and 15, a fuel line 30, 31 and 32 extends to a port on the right-hand selector valve 33 also located within the fuselage. A short line 34 is connected between the inlet ports of each of the valves and a reversibly driven fuel pump 35 provided with a driving source 36. The details of the valves 33, which are identical in construction, are shown in Figure 3 where 37 represents the body of the valve and 38 the cylindrical plug rotatably mounted within the body. The plug 38 is provided with an axially extending bore 39 which communicates with a selector bore 40 extending at right angles to the axis of the plug. Three ports 41, 42 and 43 are provided in the body portion of 37 for cooperation with the selector bore 40. The valve inlet line 34 communicates directly with the central hole 39 and, by turning the plug 38 by means of a suitable handle (not shown) until the bore 40 registers with any one of the three ports, the fluid entering the valve through the tube 34 may be selectively sent out through any one of these ports. The fuel lines 27, 28 and 29 are connected to the three ports 41, 42 and 43 of the left-hand valve 33 while the fuel lines 30, 31 and 32 are connected to the three ports 41, 42 and 43 of the right-hand valve 33. By this arrangement the fuel from any one of the tanks 6, 8 and 14 may be transferred into any one of the tanks 10, 13 and 15 located on the opposite side of the craft. Similarly, by reversing the direction of rotation of the pump 35, fuel from any one of the tanks 10, 13 and 15 may be transferred to any one of the tanks 6, 8 and 14. Thus, by transferring the fuel from one side of the aircraft to the other and then back again, it is possible to make a transfer between two tanks located on the same side of the aircraft when this becomes desirable. It will ordinarily, however, be sufficient in most cases to transfer fuel from a tank on one side of the aircraft to one of the tanks on the other side thereof.

From the foregoing description it will be seen that we have provided a fuel system which is extremely simple and devoid of any unnecessary complications, thereby greatly enhancing its value for use on military aircraft. Due to the low initial first cost of the system and its ease of repair it is also very well adapted for use on commercial planes of the multiengined type.

Having thus described our improved fuel system and noting its many advantages over the previous fuel systems, what we claim as new and desire to secure by Letters Patent, is:

1. A fuel supply system for multiengined aircraft comprising two groups of fuel tanks, each tank of each group being communicatively connected with one of the engines of said craft, a pair of selector valves each having a common port and a plurality of distributing ports, means communicatively connecting each of the tanks of one group with a distributing port on one of said valves and similar means communicatively connecting each of the tanks of the other group with a distributing port on the other of said valves, and means communicatively connecting the common port of one valve with the common port of the other valve including a pump means whereby the fuel in any of the tanks of one group may be transferred to any of the tanks of the other group.

2. A fuel supply system for multiengined aircraft comprising a pair of selector valves each having a common port and a plurality of distributing ports, two groups of fuel tanks for supplying the engines with fuel, each of the tanks of one group being communicatively connected with a distributing port on one of said valves and each of the tanks of the other group being communicatively connected with a distributing port on the other of said valves, and means communicatively connecting the common port of one valve with the common port of the other valve including a pump means whereby the fuel in any of the tanks of one group may be transferred to any of the tanks of the other group.

3. A fuel system for multiengined aircraft comprising a plurality of fuel tanks divided into two groups, a direct fuel line extending from each tank to one of the engines of said aircraft, a fuel distributor valve associated with each group of tanks, each of said valves having a common port and as many distributing ports as there are tanks in each group, a fuel transfer line extending from each distributing port of each valve to one of the tanks associated with said valve, and a reversible fuel pump for transferring fuel from one group of tanks to the other group of tanks, said pump having a first port connected to the common port of one of said valves and a second port connected to the common port of the other of said valves.

4. A fuel system for multiengined aircraft comprising two groups of engines, a group of fuel tanks associated with each group of engines, each group of tanks including an individual fuel tank for each engine of that group and a reserve tank, a direct fuel line extending from each engine of each group to its individual tank, a fuel distributor valve associated with each group of tanks, each of said valves having a common port and as many distributing ports as there are tanks in each group, a fuel transfer line extending from each distributing port of each valve to one of the tanks associated with said valve, and a reversible fuel pump for transferring fuel from one group of tanks, said pump having a first port connected to the common port of one of said valves and a second port connected to the common port of the other of said valves.

5. A fuel system for multiengined aircraft comprising two groups of fuel tanks, each group of tanks including one or more individual tanks and a reserve tank, a direct fuel line extending from each engine of the aircraft to one of the individual tanks, a fuel distributor valve associated with each group of tanks, each of said valves having a common port and as many distributing ports as there are tanks in each group, a fuel transfer line extending from each distributing port of each valve to one of the tanks associated with said valve, and a reversible fuel pump for transferring fuel from one group of tanks to the other group of tanks, said pump having a first port connected to the common port of one of said valves and a second port connected to the common port of the other of said valves.

6. A fuel supply system for multiengined aircraft comprising two groups of fuel tanks, each tank of each group being communicatively connected with one of the engines of said craft, and means for transferring the fuel from any of the tanks of one group to any of the tanks of the other group, said means including a selector valve associated with each group of tanks, each of said valves having a common port and a plurality of distributing ports, a reversible fuel pump communicatively connected with the common port of each of said valves, and an individual conduit connecting each tank of each group with a distributing port of its associated valve.

LEONARD F. HARMAN.
ORVAL H. SNYDER.